United States Patent [19]
Peters

[11] 4,097,901
[45] Jun. 27, 1978

[54] LAG REDUCTION IN IMAGE TRANSDUCERS HAVING DYNAMICALLY SHAPED RASTERS

[75] Inventor: David L. Peters, Whitney Point, N.Y.
[73] Assignee: The Singer Company, Binghamton, N.Y.
[21] Appl. No.: 786,838
[22] Filed: Apr. 12, 1977
[51] Int. Cl.² .............................................. H04N 5/34
[52] U.S. Cl. ..................................................... 358/223
[58] Field of Search ........................................ 358/223
[56] References Cited
FOREIGN PATENT DOCUMENTS
1,905,015  2/1969  Germany ............................. 358/223
2,029,876  6/1970  Germany ............................. 358/223

Primary Examiner—Richard Murray
Attorney, Agent, or Firm—James F. Duffy; Jeffrey Rothenberg

[57] ABSTRACT

An active retrace beam is used to reduce the effects of lag in an image transducer. The retrace beam is defocussed to provide large area, uniform stripping action. After the read-out beam has traced across the photocathode of the image transducer, the active retrace beam is vertically stepped back to an earlier point in the raster field and retrace is initiated. After the active retrace scan, the beam is vertically stepped down to a point one line below the previously read-out scan line and the read-out scan is initiated. A fairly large area of the photocathode receives several overlapping erasure scans by the defocused, active retrace beam each time a field is scanned. Uniform erasure results. Very little time is required, so the invention may be utilized in system demanding minimal retrace times.

6 Claims, 20 Drawing Figures

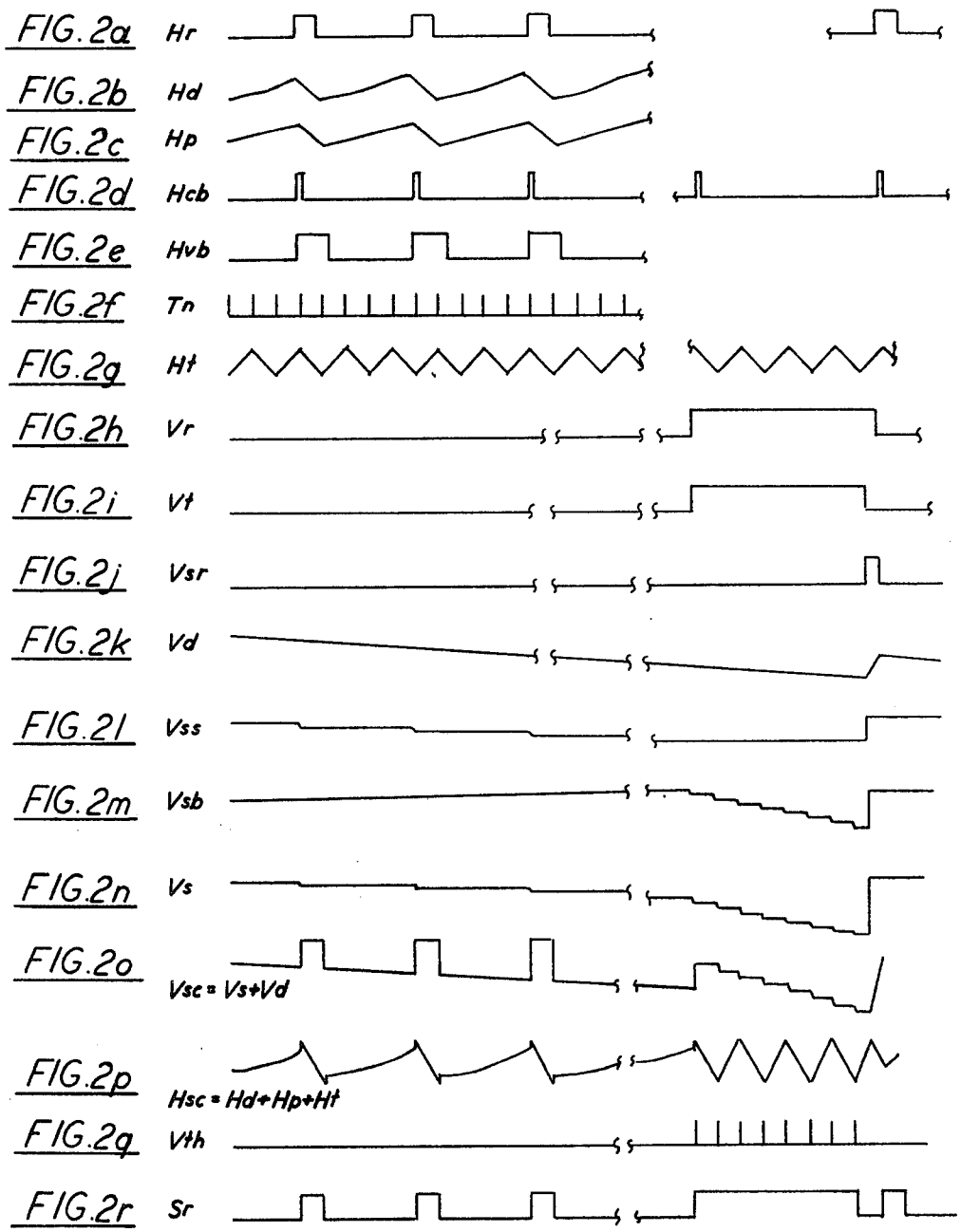

LAG REDUCTION IN IMAGE TRANSDUCERS HAVING DYNAMICALLY SHAPED RASTERS

The government has rights in this invention pursuant to contract number N61339-75-C-0009 awarded by the Department of the Navy.

BACKGROUND

1. Field of the Invention

The invention relates to image transducers, particularly to the retention of image (lag) on the photocathode of such image transducers as image-orthicons or vidicons after scanning by an electron read-out beam, especially in those situations wherein the read-out raster is statically or dynamically shaped.

2. Description of the Prior Art

Like the magical pitcher which never empties, the photocathode of such image transducers as the image orthicon or vidicon displays a great reluctance to fully drain its charge-stored image. Even after scanning by an electron read-out beam, an operation which would normally be expected to fully discharge the photocathode, image retention of 25% or more may be experienced. The effect of such image retention is to produce a smear in the final display in those dynamic situations in which the object being imaged is itself moving or wherein the size or shape of the raster is changed after one or more scanning frames.

When a raster is dynamically varied, a second problem presents itself. Conventionally, the photocathode is scanned using a raster in which there is a finite spacing between read-out scan lines. The photosensitive material of the photocathode tends to become saturated in those areas not scanned by the read-out beam. When the raster is changed, causing the beam to traverse the previously unscanned area, a phenomenon known as "flashing" occurs. As the beam reads across the saturated area, a saturated signal is output, producing a brilliant, full white, flash effect regardless of scene content. The effect is relatively long lived, decaying exponentially over one or two seconds.

Several techniques have been devised for eliminating the effects of lag. One approach is to flood the photocathode with light so as to raise the photoactive surface toward saturation and thus obliterate details of a retained image. The photocathode is then wiped clean by scanning it several times with the read-out beam, at the same time blocking any output to the final display circuitry. This technique may only be used in situations in which retrace time between raster fields is relatively long or in which raster fields are used alternately to first read out the image and then to wipe the flooded surface clean. The approach is not practical for use in a fully interlaced field system such as is required with live television.

A method of reducing the effects of lag without flooding the photocathode with light is to rescan the photocathode during retrace time using an active read-out beam. As before, the output to the final display is blocked during this rescan period. To be effective, a long vertical retrace time is required. When the system-required vertical retrace time approaches the equivalent of the time necessary to trace ten to twenty horizontal scan lines, such rescanning techniques take too long to be able to provide a solution to the lag problem.

A third approach provides for the erasure of a line just read by retracing along that same line with an active beam. Although some success has been achieved using this method in non-shaped raster systems, it has proven impractical in systems requiring specially shaped rasters since hysterisis effects prevent the erase beam from precisely tracking the path traveled by the read beam.

It is an object of the present invention to reduce the effects of residual image retention (lag) in image transducers, such as image orthicons and vidicons.

It is a further object of the invention to reduce lag in systems requiring either or both statically shaped and dynamically shaped rasters.

The invention is intended to eliminate flashing in dynamic raster systems, to provide even erasure of residual image, to permit several erasure scans prior to the next active read-out scan, and to provide the above in a manner independent of hysterisis and other scan non-linearity effects.

The invention may be used in systems in which the vertical retrace time is limited to the equivalent of the time required for two to five horizontal scan lines.

SUMMARY OF THE INVENTION

An active retrace beam is used to reduce the effects of lag in an image transducer. Sufficient beam current to strip the residual image is provided. The retrace beam is defocussed to provide large area, uniform stripping action. After the read-out beam has traced across the photocathode of the image transducer, the active retrace beam is vertically stepped back to an earlier point in the raster field and retrace is initiated. Stepping back to an earlier point in the raster allows lag buildup to return to the photoactive surface of the photocathode and assures that no part of the large, defocussed retrace beam will impinge upon the area of the next read-out scan. After the active retrace scan, the beam is vertically stepped down to a point one line below the previously read-out scan line and the read-out scan is initiated.

In this manner a fairly large area of the photocathode receives several overlapping erasure scans by the defocused, active retrace beam each time a field is scanned. Uniform erasure results, and the backstepped erase beam is not adversely affected by hysterisis or other non-linearity effects. Very little time is required to offset and reset the beam, so the invention may be utilized in systems demanding minimal retrace times.

DESCRIPTION OF THE DRAWINGS

FIG. 1 illustrates a suggested raster shape useful in practicing the invention.

FIGS. 2a-2r illustrate various waveshapes which may be employed in practicing the teachings herein.

DESCRIPTION OF THE INVENTION

Figure 3:
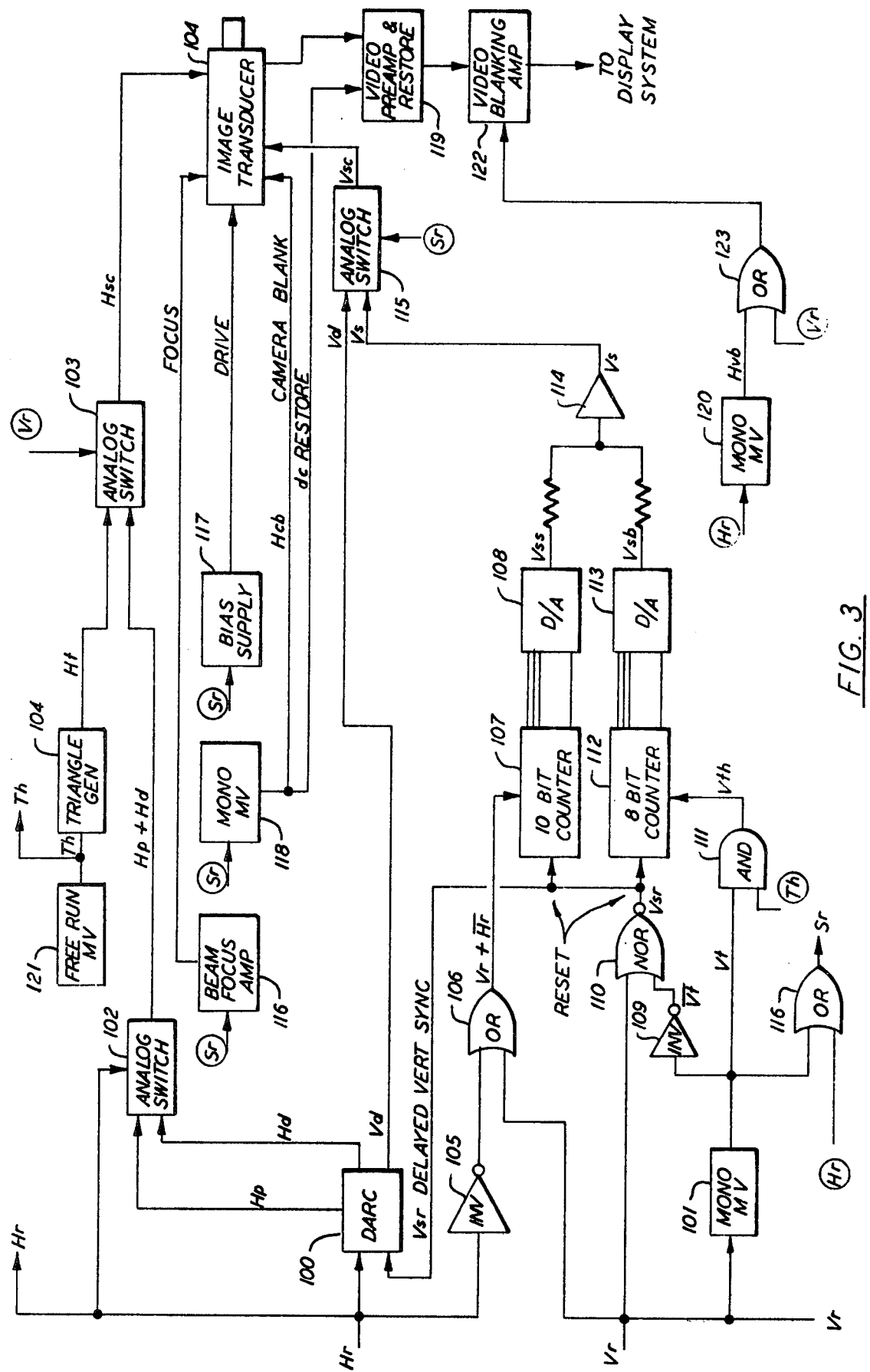
FIG. 3 suggests a hardware assemblage for deriving the waveshapes of FIG. 2.

The problem of lag in image transducers is compounded when raster shaping is required. Systems which employ electronic zooming effects or which effect perspective changes by electronically varying the shape of the raster pattern or the speed at which portions of the raster are scanned present the designer with special challenges. Non-linearities in scanning-system components preclude attempting a precise retrace, for erasure purposes, of the line just scanned for read-out. Since dynamically shaped rasters are constantly subject to variations in size, shape, and location of raster lines, flashing occurs as previously unscanned, and thus saturated, areas become activated.

The invention reduces the effects of lag and flashing by means of a backstepped, full-cathode coverage, erasure scan.

Lag is reduced by erasure of the residual image by scanning across a previously read segment of the photocathode using a defocussed and active retrace scan. At the end of a read-out scan the beam is displaced back up the raster field, say 10 horizontal scan lines. The beam is then defocussed and the drive to it increased. During retrace the beam is maintained active to achieve erasure. Defocussing assures that the erasure scan simultaneously affects several previously read-out scan lines so as to provide a flat field, uniform erasure; while the increased drive supplies sufficient beam current to strip off the residual image, i.e., lag.

Stepping back up into the raster pattern provides sufficient time, after that part of the raster has been read out, to allow the residual lag image to build up and thus be more susceptible to erasure. No attempt need be made to precisely track a previously scanned read-out line, thus there are no adverse consequences due to system hysterisis or other scan non-linearities.

Flashing is eliminated both by scanning with the defocussed beam and the fact that the entire photocathode is erased by the erasure scan regardless of the size of the raster dynamically employed at any given moment.

Because the defocussed erasure beam overlaps read-out scan lines, the areas of the photocathode between such scan lines never become saturated and thus no flash occurs when the raster is changed so as to encompass such previously unread areas. A similar comment applies to areas outside the bounds of the dynamic raster in use at any given time. Such areas of the photocathode would tend to rise toward saturation since they are not being scanned by the read-out beam. In such a case a flash would occur at the periphery of the raster when the raster is enlarged so as to cause the read-out beam to impinge upon the previously unscanned areas. To eliminate this source of flashing, the defocussed erase beam scans the entire photocathode thus striping image and lag from areas of the cathode not included within a given raster frame. The implementation of these concepts of lag reduction and flash elimination may now be considered.

FIG. 1 suggests the backstep-scan raster pattern which may be used in practicing the invention. T1 represents one read-out scan line. The read electron beam moves from left to right as drawn in FIG. 1. At the end of read-out scan T1 the beam is back-stepped to a position read earlier and retrace-scan R1, from right to left in the figure, is initiated. After retrace R1, the beam is downstepped for read-out scan T1, back-stepped for retrace R2, down-stepped for read-out T3, and so on.

On read-out scan T2, the position and relative size of the read beam is indicated by dot 10. The defocussed retrace beam is suggested by circle 11 on retrace R2. Note that by using an active but defocussed retrace beam the area which is stripped of lag comprises areas previously scanned by several read-out scan lines as well as the photocathode area lying between those scan lines. In this manner lag is effectively reduced and flashing essentially eliminated since the large defocussed erasure beam tends to impinge several times upon the same area of the photocathode during successive erasure scans such as R1, R2, and R3.

Retracing back over an area just discharged by the read-out beam requires a trade-off between signal loss and lag reduction. By back-stepping the erasure beam about ten scan lines, an area is erased which contains a high percentage of lag, while the integration of the new information being fed onto the photocathode will not yet be significant. Practice has shown that the backstepping erasure technique taught herein results in approximately fifteen percent loss in signal, fifty percent reduction in lag, and virtual elimination of flashing. The overall improvement in the final display warrants the slight reduction in signal experienced.

Dynamic raster scanning is often required for perspective transformation of the visual display. A dynamic analog raster scan computer (DARC) is disclosed by B. J. Woycechowsky in U.S. Pat. No. 3,725,563 which may be read for additional background if desired. The invention herein is described in an operational environment which makes use of a DARC. However, the backstepped erasure scan of the invention may effectively be applied to essentially any image transducer system in which lag is a problem.

The DARC provides not only primary sweep voltages but contains within it the necessary circuitry to modify these primary sweep voltages by applying sine, cosine, tangent, squared, and product functions to them as may be required to dynamically shape the display raster for purposes of perspective transformation or to achieve zooming effects.

Before discussing the block diagram of FIG. 3 it would be best to achieve an understanding of the various signal wave shapes employed. Reference should be made to FIG. 2 and the annotated table of signals which follows.

| Signal | FIG. | Comment |
|---|---|---|
| | | Signal Tabulation |
| Hr | 2a | Horizontal retrace from sync generator, not shown. |
| Hd | 2b | Dynamically varied horizontal sweep signal from DARC. |
| Hp | 2c | Primary term of horizontal sweep signal, not variable. |
| Hcb | 2d | Camera blanking; 1μ sec typical, rises at leading edge of Sr, enables dc restoration of tube. |
| Hvb | 2e | Video blanking signal; typically 1μ sec longer than Hr. |
| Th | 2f | Timing pulses; output by multivibrator 121, approximate period of Hr, time staircase voltage Vsb and erasure scan voltage Ht. |
| Ht | 2g | Triangular sweep derived by integration of Th in triangle generator 104, used to generate the horizontal erasure scan during vertical retrace time to back-step-erase lower image area of tube. |
| Vr | 2h | Vertical retrace from sync generator, not shown. |
| Vt | 2i | Pulse derived from Vr triggering of monostable multivibrator 101, duration less than Vr by approximate time required to scan one-half horizontal line. |
| Vsr | 2j | Vertical sweep retrace signal, a delayed vertical retrace, the delay equal in length to Vt. Delay is used for erasure during vertical retrace time. |
| Vd | 2k | Dynamically varied vertical sweep signal from DARC. |
| Vss | 21 | Vertical signal for back step during scan time, 10 bit (for 1000 line system) staircase output from Hr driven counter 107 and D/A converter 108. |

Signal Tabulation

| Signal | FIG. | Comment |
|---|---|---|
| | | *-continued*<br>Staircase steps occur only during vertical trace time, level output during retrace since counter 107 is driven by Or'ed signal Vr + Hr from OR gate 106. |
| Vsb | 2m | Vertical signal for backstep during vertical retrace time (Vt), 8-bit staircase output from Th-driven counter 112 and D/A converter 113. Staircase steps occur only during vertical retrace time, level output during vertical trace time since counter 112 is driven by AND'ed signals Th and Vt (i.e., Vth) from AND gate 111. |
| Vs | 2n | The analog sum of signals Vss and Vsb. Vss will provide the backstep applied to the scan Vd for erasure at the end of each horizontal scan and during vertical retrace time. |
| Vsc | 2o | Resultant vertical scan signal applied to the camera; the time shared output of analog switch 115 driven by Sr. Switch inputs: Vs and Vd. See comment above. |
| Hsc | 2p | Resultant horizontal scan signal applied to the camera; the time shared output of analog switch 103 driven by Vr. Switch inputs Ht and the OR'ed combination of Hp and During vertical trace time Hsc consists of the dynamically varied horizontal scan portion of Hd and the non-varying horizontal retrace portion of Hp. Since erasure occurs during horizontal retrace, use of the retrace portion of Hp assures a full cathode erasure sweep. During vertical retrace time. Hsc consists of erasure scan Ht. |
| Vth | 2q | Drive to counter 112. The AND'ed combination of Vt and Th results in counter 112 and D/A 113 outputing a staircase signal Vsb only during the time of Vt. |
| Sr | 2r | The OR'ed combination of Vt and Hr; provides retrace timing drive signals. |

FIG. 3 may now be considered in light of the foregoing discussion. To the upper right of the drawing, the camera is depicted with image transducer 104. Beam focus current is provided to image transducer 104 from beam focus amplifier 116. Beam drive current is derived from bias supply 117. Camera blanking is obtained from monostable multivibrator 118. Monostable multivibrator 118 also provides dc restoration voltage to video preamp and dc restorer 119. The video output of camera 104 is provided to video preamp 119, from thence to video blanking amplifier 122, and then on to the display system. A video blanking signal is provided video blanking amplifier 122 from the combination of monostable multivibrator 120 and OR gate 123.

Monostable multivibrator 120 is triggered by Hr the horizontal retrace from a sync generator now shown in the drawing. Multivibrator 120 outputs a horizontal video blanking signal, H$vb$, which is approximately one microsecond longer in duration than horizontal retrace signal Hr. Vertical retrace signal Vr and horizontal blanking signal H$vb$ are combined in OR gate 123 with the result the video blanking amplifier 122 receives blanking signals at the end of each horizontal scan of image transducer 104 and also during that period established by Vr as the nominal vertical retrace time for image transducer 104.

Camera 104 is driven by horizontal and vertical scan signals Hsc and Vsc respectively. Reference to the annotated signal table and FIG. 2p indicates that the horizontal scan signal Hsc is the resultant of three signals. The three signals in question comprise the dynamically-varied horizontal scan signal Hd output from the dynamic analog raster computer (DARC) 100; the retrace of the primary term of the horizontal sweep voltage, also available from DARC 100; and triangular signal Ht.

The result of using a composite scan signal made up of dynamic signal Hd and non-varying return Hp is that, while the scan line being dynamically varied may, or may not, traverse the entire width of the photocathode of image transducer 104, the retrace portion of the scan Hp, being derived from the primary sweep term will always cause the beam to move horizontally from one extreme of the cathode to the other thus providing full coverage.

FIG. 2p also shows the during the time period of the nominal retrace signal Vr, the horizontal scan signal is one which drives the electron scan beam of image transducer 104 rapidly back and forth through a series of horizontal traversals. This rapid horizontal scan signal Ht is derived from triangle generator 104. It is convenient to note at this point the timing relationship between the vertical scan signal and the horizontal scan signal, Vsc and Hsc respectively. During the time which the horizontal beam is being rapidly exercised in response to signal Ht, vertical scan signal Vsc has assumed a staircase waveform. It may readily be understood from study of FIGS. 2o and 2p that during the nominal vertical retrace time of the system, as determined by the period of signal Vr, the horizontal scan beam moves across the photocathode, is stepped down on the retrace, is stepped down to scan another line, is stepped down again on the retrace, and so on, each horizontal trace and retrace being across a different position of the photocathode. It will be seen that the purpose of this rapid traversal down and across the photocathode during the vertical retrace period is to erase any residual image on the lower portion of the photocathode after read-out scanning of a raster field has been completed.

Returning to FIG. 3 it is seen that DARC 100 receives its horizontal sync from Hr which is derived from sync generator now shown in the figure. DARC 100 outputs the dynamically varying horizontal scan signal Hd and the nonvarying primary term of the horizontal scan Hp. Both of these signals are input to analog switch 102. Analog switch 102 is driven by horizontal retrace signal Hr such that the output of the switch, in response to drive Hr, outputs the retrace portion of primary scan signal Hp, and the dynamically varying trace portion of scan signal Hd. This time shared combination Hp plus Hd is fed to analog switch 103.

Free running multivibrator 121 provides a series of pulses Th to triangle generator 104 where the pulses are integrated and amplified to produce triangular waveshape Ht. Triangular wave Ht is fed to the remaining input of analog switch 103. Switch 103 is driven by nominal retrace signal Vr. Switch 103 operates such that during the vertical retrace period established by Vr triangular signal Ht is output by the switch, whereas, during the vertical scan time, the composite signal $Hp$ plus $Hd$ is output by the switch.

The resultant operation of switches 102 and 103 is the composite horizontal scan signal $Hsc$ (FIG. 2p) which is provided as the horizontal drive for image transducer camera 104.

The vertical scan signal provided to camera 104 is also a time shared composite signal. Vertical scan signal $Vsc$ is comprised of the dynamically variable vertical scan signal $Vd$, FIG. 2k, output from DARC 100, and the two staircase waveform signals $Vss$ and $Vsb$. Staircase signal $Vss$ is derived from the combination of ten-bit counter 107 and D/A amplifier 108. Horizontal retrace signal $Hr$, inverted by inverter 105, is combined in OR gate 106 with vertical retrace signal $Vr$. The output of OR gate 106 drives counter 107 with the result that D/A 108 outputs the staircase signal $Vss$ which signal provides a step for each $Hr$ pulse but which remains level during the vertical retrace time of signal $Vr$.

Staircase signal $Vsb$ derives from the combination of the eight-bit counter 112 and D/A converter 113. $Vsb$ is a staircase waveform which remains level during the vertical scan time but which steps during the erasure scan period determined by signal $Vt$. This resultant waveform is arrived at by driving ten-bit counter 112 with a signal $Vth$. $Vth$ is a train of pulses output from AND gate 111 at the time signals $Vt$ and $Th$ are both present at its input. $Vt$ is a pulse occurring in time sequence with vertical retrace $Vr$ and being shorter in time duration than $Vr$ by approximately the amount of time it would take to trace half a horizontal scan line. $Vt$ is derived from monostable multivibrator 101 driven by vertical retrace signal $Vr$. $Th$ is the pulse train output of free-running multivibrator 121.

The analog sum of staircase signals $Vss$ and $Vsb$ is taken through summing amplifier 114 and is designated as signal $Vs$, shown in FIG. 2n. Signal $Vs$ is input to analog switch 115 where, in combination with the dynamically varied vertical scan signal $Vd$ from DARC 100, it provides at the output of the switch a composite time shared signal $Vsc$. Reference to FIG. 2o shows that $Vsc$ is comprised of the dynamically variable vertical scan signal $Vd$ upon which is impressed a step function which occurs during each horizontal retrace period and upon which is also impressed a staircase wavetrain during the erasure scan period and more specifically during the time established by signal $Vt$.

A comparison of FIGS. 2o and 2p will show that the vertical scan signal $Vsc$ applied to camera 104 will be stepped back to a position on the cathode of image transducer 104 which had been earlier scanned. This backstepping in position will occur each time the horizontal scan signal $Hsc$ goes through its horizontal retrace. The effect of this arrangement is to allow for an active retrace of a previously scaned portion of the cathode of image transducer 104. Such active retrace will tend to strip any residual image or lag remaining. The right hand portions of FIGS. 2o and 2p, that is, the staircase response of $Vsc$ and the triangular response of $Hsc$, were discussed earlier. At the completion of a scanning field, the beam will be stepped back to an earlier scanned positon by $Vsc$ and then rapidly scanned horizontally by $Hsc$; the staircase drawing the horizontal scan down to the bottom of the cathode and the horizontal scan providing a rapid erasure during the period established by $Vt$.

The time period $Vt$ during which the rapid erasure scan of the cathode of image transducer 104 takes place occupies a major portion of the retrace period established by retrace signal $Vr$. The time alloted for the vertical retrace is the time determined by signal $Vsr$. $Vsr$ has a duration about equal to that time period required to scan one-half of a horizontal line length. $Vsr$ is derived by taking the difference between the signals $Vr$ and $Vt$. Signal $Vt$ is obtained from the output of monostable multi-vibrator 101 inverted by inverter 109 and combined in NOR gate 110 with vertical retrace signal $Vr$. The resultant output of NOR gate 110 is signal $Vsr$ (FIG. 2j) which is used as a reset pulse for counters 107 and 112, and as a delayed vertical sync pulse for DARC 100. The system is thus synchronized to this delayed vertical pulse $Vsr$ rather than to the nominal retrace signal $Vr$.

A second timing signal of importance is $Sr$. $Sr$ is derived from the output of OR gate 116 which has as its input horizontal retrace signal $Hr$ and the output of multi-vibrator 101, $Vt$. $Sr$ (FIG. 2r) provides an output for each horizontal retrace pulse $Hr$, and for each occurrence of signal $Vt$.

Signal $Sr$ is employed to drive analog switch 115 such that the vertical scan signal $Vsc$, applied to the image transducer 104, consists of the dynamically variable signal $Vd$ only during actual read-out scan of the cathode of image transducer 104. At the times dictated by timing signal $Sr$ the backstepped erasure scan signal $Vs$ is output to image transducer 104 as its vertical scan signal $Vsc$. $Sr$ thus occurs at the time the beam is in its erasure mode.

$Sr$ is applied also to beam focus amplifier 116 so as to cause the erased beam to be defocused and therefore encompass a larger area of the cathode of transducer 104 each time the beam makes an erasure scan. So too, $Sr$ is applied to the bias supply 117 so that during erasure, the electron beam drive is increased therefore further improving its efficiency in reducing any lag image.

$Sr$ is also applied as drive to monostable multivibrator 118. The output of multivibrator 118 is a pulse of about 1 microsecond in length arising at the leading edge of signal $Sr$. This one microsecond pulse $Hcb$, output by multi-vibrator 118, is applied to image transducer 104 as a camera blanking pulse to establish black level, and to video preamp and dc restorer 119 to dc restore the amplifier to the black reference level.

The overall operation, then, of the circuitry shown in FIG. 3, is to provide an image transducer which may be read-out in normal scan but which, during horizontal retrace time, employs a backstepped, active, erasure retrace scan and which, at the completion of each field scan and prior to vertical retrace, employs a series of rapid erasure scans of that portion of the photocathode of the image transducer not previously erased during the horizontal retrace times. The active erasure beams are defocused to increase the area of coverage. Drive is increased while in the erasure mode to better reduce any residual lag image. The invention permits the use of conventional television interlaced field techniques. The erasure scan provides coverage of the entire photocathode, thereby eliminating any flashing which may occur when the system in question employs rasters dynamically variable in size and shape. Because the erasure beam is defocused, a given area of the photocathode will receive several erasure scans since an effect of defocussing is to cause the erasure beams to overlap.

While it has been described what is at present considered to be a preferred embodiment of this invention, it will be obvious to those skilled in the art that various changes and modifications may be made therein without departing from the invention. Therefore it is intended to cover herein all such changes and modifications as fall within the true spirit and scope of the invention.

Having thus described my invention, that which I claim as new and desire to secure by Letters Patent of the United States is:

1. A method of reducing lag in image transducers such as image orthicons and vidicons by use of an erasure scan during nominal horizontal and vertical retrace times thereby allowing use of conventional T.V. interlaced field techniques comprising the steps of:
  A. At the end of a horizontal read-out scan of the image transducer
    1. backstepping the electron beam of said image transducer up to a position earlier scanned during readout,
    2. retracing horizontally across the cathode of said image transducer with said electron beam to erase any lag image,
    3. repositioning said electron beam to begin the next horizontal read-out scan,
    4. initiating said next horizontal read-out scan, and
    5. repeating steps A1 through A4 until the last horizontal scan line in a given reaster field has been scanned, then
  B. When the last horizontal line in the field has been scanned
    1. back-stepping the electron beam up to the region last erasure-scanned by said beam,
    2. performing multiple erasure scans so as to completely erase the remaining surface of said cathode within the time normally available for vertical retrace in conventional T.V. systems,
    3. repositioning said electron beam to begin the first horizontal read-out scan,
    4. initiating said next raster field scan, and
    5. repeating steps A and b.

2. A method of reducing lag in image transducers such as image orthicons and vidicons by use of an erasure scan during nominal horizontal and vertical retrace times thereby allowing use of conventional T.V. interlaced field techniques comprising the steps of:
  A. at the end of a horizontal read-out scan of the image transducer
    1. back-stepping the electron beam of said image transducer up to a position earlier scanned during readout,
    2. defocussing said electron beam,
    3. retracing horizontally across the cathode of said image transducer with said defocussed electron beam to erase any lag image,
    4. refocussing said electron beam,
    5. repositioning said electron beam to begin the next horizontal read-out scan,
    6. initiating said next horizontal read-out scan, and
    7. repeating steps A1 through A6 until the last horizontal scan line in a given raster field has been scanned, then
  B. when the last horizontal line in the field has been scanned
    1. back-stepping the electron beam up to the region last erasure scanned by said defocussed electron beam,
    2. defocussing said electron beam,
    3. performing multiple erasure scans, so as to completely erase the remaining surface of said cathode within the time normally available for vertical retrace in conventional T.V. systems,
    4. refocussing said electron beam,
    5. repositioning said electron beam to begin the first horizontal read-out scan in the next raster field,
    6. initiating said next raster field scan, and
    7. repeating steps A and B.

3. The method of 2 including the step of increasing the drive to said electron beam when said beam is used to erase any lag image.

4. Means for reducing lag in image transducers such as image orthicons and vidicons comprising:
  (a) a camera head having an image transducer with photocathode scanned by an electron beam and associated means to control said beam for raster scanning of said photocathode;
  (b) means to backstep said electron beam at the end of each horizontal scan such that the retrace of said electron beam traverses a portion of the photocathode earlier scanned, said retrace beam being an active beam so as to erase any residual image remaining after the earlier scan;
  (c) additional means to assume control of said electron beam at the end of each scanning field so as to backstep said beam to the region last traversed by said active, erasure retrace beam, with means to staircase the vertical drive to said electron beam while performing an active horizontal scan at the steps of the staircased drive such that a rapid erasure scan of the remaining portions of said photocathode takes place, with further means for the timely relocation of said electron beam to initiate the scanning of the next raster field.

5. The invention of claim 4 including means to defocus said electron beam as it makes an erasure scan.

6. The invention of claim 4 including means to increase the drive to said electron beam as it makes an erasure scan.

* * * * *

UNITED STATES PATENT AND TRADEMARK OFFICE
CERTIFICATE OF CORRECTION

PATENT NO. : 4,097,901
DATED : June 27, 1978
INVENTOR(S) : David L. Peters

It is certified that error appears in the above-identified patent and that said Letters Patent are hereby corrected as shown below:

Col. 3, line 55, "T1" should be --T2--.

Col. 5, line 29, after "and" insert --Hd.--

Col. 5, last line, "the" (second occurrence) should be --that--.

Col. 6, line 24 "the" (first occurrence) should be --that--.

Signed and Sealed this

Seventh Day of November 1978

[SEAL]

Attest:

RUTH C. MASON
Attesting Officer

DONALD W. BANNER
Commissioner of Patents and Trademarks